July 30, 1963  B. MLÁDEK  3,099,306
MEAT GRINDER HAVING FLOATING CUTTER MEMBER
Filed March 23, 1961  3 Sheets-Sheet 1

INVENTOR.
Bedřich Mládek
BY
Richard ...
agt

July 30, 1963 B. MLÁDEK 3,099,306
MEAT GRINDER HAVING FLOATING CUTTER MEMBER
Filed March 23, 1961 3 Sheets-Sheet 3

INVENTOR.
Bedřich Mládek
BY

United States Patent Office 3,099,306
Patented July 30, 1963

3,099,306
MEAT GRINDER HAVING FLOATING
CUTTER MEMBER
Bedřich Mládek, Prague, Czechoslovakia, assignor to Zavody potravinarskych a chladicich stroju narodni podnik, Pardubice, Czechoslovakia
Filed Mar. 23, 1961, Ser. No. 97,795
10 Claims. (Cl. 146—182)

This invention relates to grinding machinery, and more particularly to a grinder for meat and like material.

In known meat grinders, the meat to be ground is moved toward a grinding head by a conveying screw which pushes the meat against a perforated cutter plate. A rotary knife mounted on the screw cuts the meat in cooperation with the edges of the cutter plate perforations against which the knife is urged by the pressure of the moving mass of meat. Because of the pressure in the cutting zone which is particularly high with cutter plates having small perforations, the knife while rotating in the compressed mass also tears the meat. A substantial portion of the drive energy transmitted to the knife is dissipated as frictional heat in the mass, thereby not only increasing the power required for the grinder drive, but also raising the temperature of the meat ground which is undesirable.

The combined pressure created by the conveying screw moving the meat axially and the knife rotating in the mass may actually become strong enough to deform the cutter plate. The several factors enumerated cooperate to produce ground meat the individual particles of which are of irregular, ill-defined shape clearly indicating that they were severed from a larger piece not so much by cutting as by tearing and crushing.

The primary object of the invention is the provision of a grinder for meat and like materials in which comminution of the material takes place by cutting to the virtual exclusion of tearing and crushing.

A more specific object is the provision of such a grinder in which meat is chopped by the shearing cooperation of two cutting edges only.

A further object is the avoidance of internal friction and of the concomitant heat as far as this is at all possible in a device which relies on a screw conveyor as feeding means.

Another object is the avoidance of pressure in the moving mass of meat to the geratest possible extent, and total elimination of pressure exerted by meat particles against the cutting edges of the knife member except during shearing cooperation with the cutting edge of the cooperating cutter plate.

With these and other objects in view, the invention in its basic aspects contemplates the use of a housing enclosing an elongated cavity through which the meat and the like is conveyed by a conveying screw rotating about the cavity axis or other conveying means. A rotary knife member is axially fixed in the cavity and cooperates with a cutter plate which is recessed for the axial passage of meat therethrough. The cutter plate which is interposed between the conveying screw and the rotary knife member is axially freely slidable in the grinder cavity toward the knife member in the direction of material movement and away from the knife member in the opposite direction.

In its more specific aspects, the invention provides a hub member coaxially rotatable in the grinder cavity. The hub member has a coaxial guide portion of preferably conical shape and tapering toward the conveying screw, that is, in a direction opposite to the direction of meat movement, thereby guiding the meat toward an annular circumferential passage between the housing walls and the hub member. Blade elements are mounted on the hub member and project into the passage. They cooperate with a cutter plate in the aforedescribed manner.

Other features of this invention and many of the attendant advantages will become readily apparent from the following detailed descriptions of two preferred embodiments of the meat grinder of the invention when taken in conjunction with the attached drawing in which.

Figure 1:
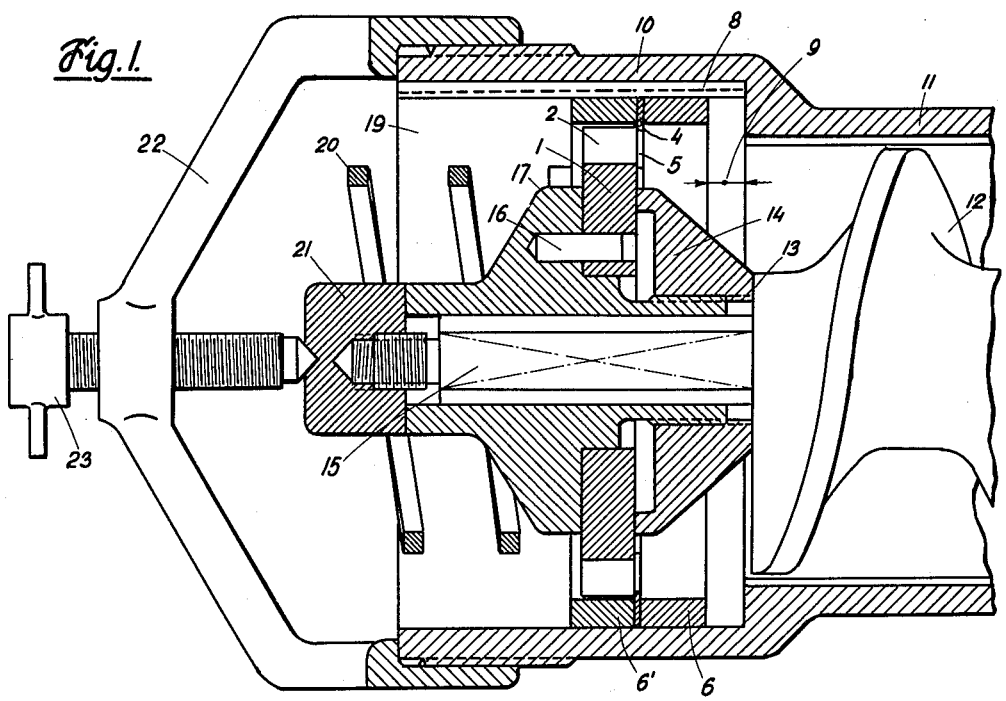
FIG. 1 shows the cutter head of a first embodiment of the invention in axially sectional view.
Figure 2:
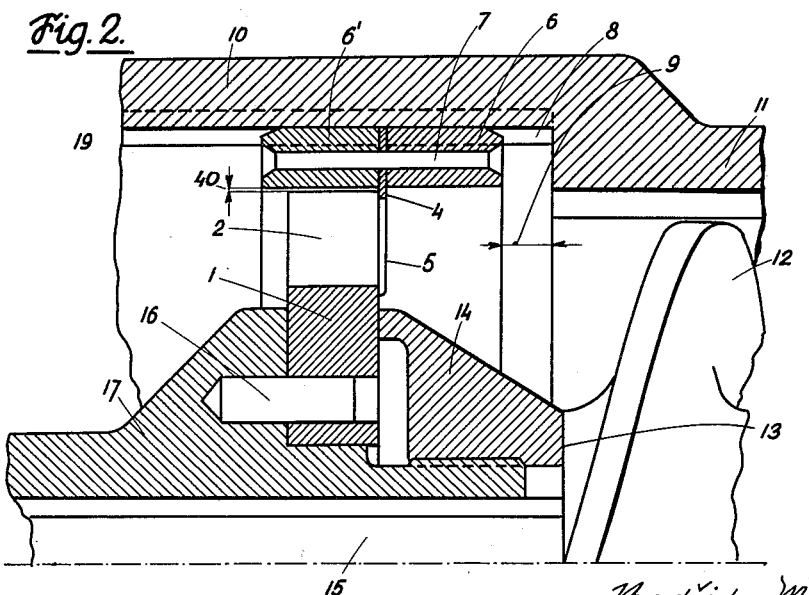
FIG. 2 shows a detail of the apparatus of FIG. 1 on an enlarged scale.

Referring to the drawing now in more detail, and initially to FIGS. 1 to 4, there is seen the cutter head portion of a meat grinder of the type in which meat pieces of suitable size are fed to a conveyor screw rotating in a casing, and thereby axially feeding the meat pieces to the cutting apparatus proper which is located at one end of the conveyor casing.

As seen in FIG. 1, the conveying screw 12 is rotatable in a cylindrical conveyor housing 11. Only one end of the screw is visible, and it will be understood that the other end extends from the casing axially outward in the usual manner, and carries a pulley or crank by means of which it is rotated so that meat is conveyed by the several flights of the screw from a feeding funnel or the like (not shown) in a direction toward the left as viewed in FIG. 1.

The radially extending terminal face 13 of the screw 12 abuts against the smaller base of a coaxial frustoconical guide member threadedly mounted on a tubular portion of a hub member 17 so as to form a fixed unit therewith. The screw 12 is mounted on a drive shaft 15 of rectangular cross section which extends beyond the screw face 13. The hub member 17 has a conforming central bore in which it receives the free end of the shaft 15, and defines an annular passage 19 with the cutter head housing 10 which is integral with the conveyor housing 11 but of somewhat larger diameter. The annular passage 19 is open at one axial end to permit discharge of ground meat. The hub member 17 is urged into abutting contact with the screw face 13 by a coaxial adjusting screw 23 which threadedly engages a yoke 22 firmly secured to the cutter head housing 10, and rotatably engages a coaxial cap nut 21 on the hub member 17.

A rotary knife 1 is clamped between the conical guide member 14 and a shoulder on the hub member 17. It is prevented from rotating relative to the hub member by a heavy connecting pin 16. As best seen from FIGS. 2 to 4, the rotary knife 1 is equipped with cutting blades which extend radially outward into the passage 19. The blades are about as high in a radial direction as they are long in a direction inclined relative to a radial plane by an angle smaller than 90°. In the embodiment illustrated in FIG. 4, this angle α is about 45°. The blades are relatively thin in a circumferential direction. Their cutting edges 3 are formed by a narrow face in a radial plane and one of the inclined faces which together define the angle α (see FIG. 4).

The blades 2 cooperate with an annular cutting plate 4 which is very thin in the axial direction. The plate 4 is mounted between two cylindrical rings 6 and 6' which are fastened to each other and to the plate 4 by rivets 7.

The rings 6, 6' conform to the internal wall of the cutter head housing 10 and are axially slidable therein. Their movement is limited to the stroke 9 by abutment of the cutting plate 4 against the blades 2, and by abutment of ring 6 against a shoulder of the cutter head housing 10 adjacent the conveyor housing 11. Because of this limited stroke which is shorter than the axial length of the blades 2, the ring 6' is radially aligned with at least a portion of the blades 2 under all conditions and serves to guide the blades and to prevent by-passing of the blades by meat being ground. The rings 6, 6' are prevented from rotation by a key 8 extending along the passage 19 and engaging a corresponding keyway 18 in the rings 6, 6'.

Figure 3:
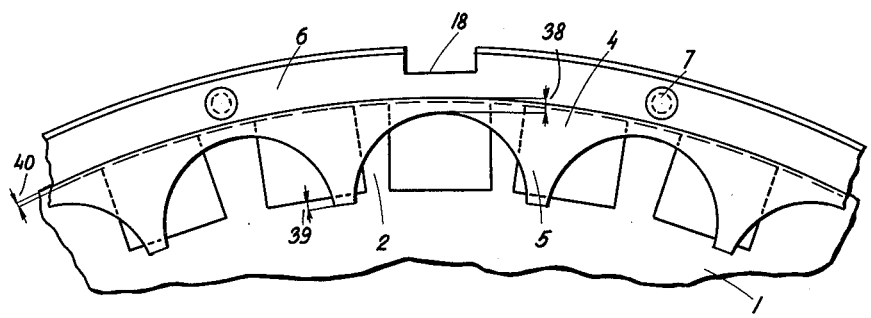
FIG. 3 illustrates a portion of the device of FIG. 2 in a view taken in the direction of the axis of the device of FIG. 2.
Figure 4:
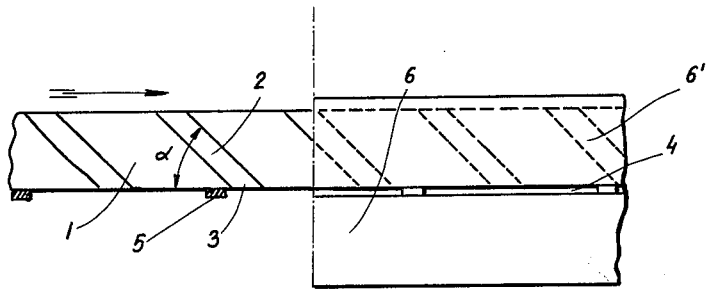
FIG. 4 shows the device of FIG. 3 in a view taken in a radial direction.

As best seen in FIG. 3, the inner edge of the cutting plate 4 is scalloped. Semi-circular recesses are cut into the edge of the plate in such a manner that the angular center-to-center spacing of two adjacent recesses is equal to 1.5 times the center-to-center spacing of two adjacent blades 2. The recesses in the plate 4 leave correspondingly spaced teeth 5 therebetween. The free ends of the teeth 5 extend radially inward beyond the base of the blades 2 by a small distance 39, and the base line of the teeth 5 is inwardly displaced from the internal faces of the rings 6, 6' by a small distance 38 which is greater than the clearance 40 between the blades 2 and the cooperating ring 6. Because of the overlapping of the cutter blade 4 over the axial openings about the blades 2, meat cannot pass axially through the passage 19 unless it moves through the cutting area between the teeth 5 and the blades 2.

A rod 20 formed into a helix is mounted on the discharge side of the hub member 17. The helix progresses in the same direction as the conveying screw 12 with which it moves in unison.

The apparatus illustrated in FIGS. 1 to 4 operates as follows:

Meat which is charged to the grinder at the feed end (not shown) of the screw 12 is conveyed toward the left as viewed in FIG. 1 and is spread by the pressure of succeeding meat portions over the conical guide member 14 and into the cutting area. Any meat particles partly penetrating through the wide recesses in the cutter plate 4 are sliced by the blades 2 in shearing cooperation with the teeth 5. The close shearing cooperation of the blades 2 and teeth 5 is assured by the pressure of the flowing material which urges the plate 4 against the knife 1. This cooperation is maintained regardless of the unavoidable wear of the blades and teeth. The axial position of the rotary knife 1 may be adjusted from time to time by turning the screw 23 as required. There is no wear on the portions of the blades 2 which run in the ring 6'. The entry of meat particles into the narrow gap 40 is adequately prevented.

As soon as the meat particles leave the cutting area between the blades 2 and teeth 5 they are no longer under pressure and are rapidly conveyed from the cutting area by the inclined faces of the blades 2, and further outward by the helically bent rod 20. The blades 2 do not operate against any material pressure except the desirable and unavoidable pressure exerted on the cutting edges 3 by the material being sheared.

Figure 5:
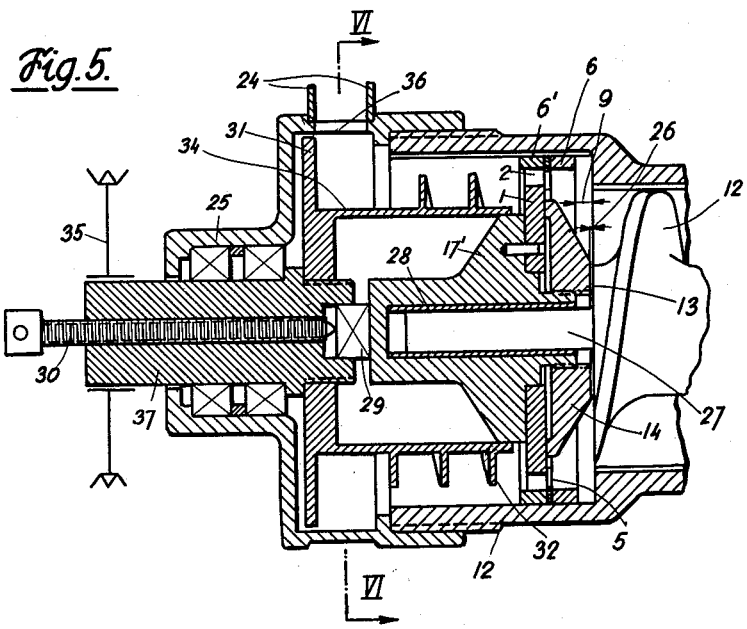
FIG. 5 is an axially sectional view of the cutter head of a second embodiment of the invention.
Figure 6:
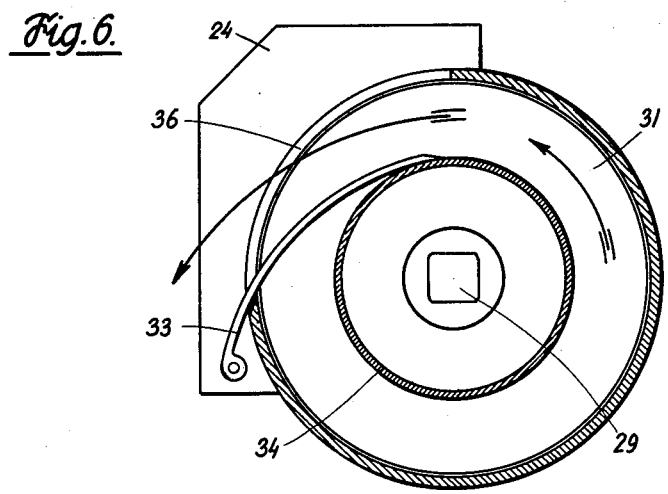
FIG. 6 is a fragmentary sectional view of the apparatus of FIG. 5 taken on the line VI—VI.

The apparatus shown in FIGS. 5 and 6 in axial and radial section respectively differs from the afore-described embodiment of the invention in the drive arrangement for the rotary knife and in the discharge mechanism. Whereas in the apparatus of FIGS. 1 to 4 the knife rotates with the conveying screw, an independent drive for the rotary knife is provided in the second embodiment.

A cylindrical stub shaft 27 projects from the radial face 13 of the conveying screw 12. It is movably received in a conforming bearing sleeve 28 provided in a recess of the hub member 17' which is thus journaled on the stub shaft 27. The hub member 17' is rotated by means of a drive shaft 37 equipped with a V-belt pulley 35 and mounted in a thrust bearing 25 the casing of which axially covers the cutter head housing 12. An axial recess of approximately square shape in the inner end face of the shaft 37 slidably receives a conformingly shaped coupling block 29 which is fixedly fastened to the hub member 17' and which transmits the rotation of the pulley 35 to the hub member. The block 29 is urged into the recess of the shaft 37 by the pressure of the material conveyed by the screw 12 against the conical guide member 14, and its axial position in the recess may be adjusted by rotation of a threaded spindle 30 coaxial with the shaft 37. The spindle 30 has a head adapted to be turned with a wrench, and a free end in the recess of the shaft 37 in contact with the block 29. Rotation of the spindle 30 controls the clearance 26 between the end face 13 of the screw 12 and the conical guide member 14.

A flange 31 is fixedly mounted on the shaft 37 and rotates with it. It carries a tubular cylinder 34 which envelopes that portion of the hub member 17 which extends from the cutting area in the direction of material discharge, but is axially movable relative to the hub member as required by the adjustment of the spindle 30. The cylinder 34 carries the flights of a conveyor screw 32 which thus rotates at the same speed and in the same direction as the rotary knife 1. The screw flights 32 do not fully extend to the flange 31, but leave a free cylinder area which is scraped by a doctor blade 33 pivoted on the outside of the grinder housing and penetrates into the interior through a discharge orifice 36 which is flanked by two guide plates 24.

The apparatus shown in FIGS. 5 and 6 chops meat in the same basic manner as the embodiment of the invention described with reference to FIGS. 1 to 4. Because of the independent drive arrangement for the rotary knife 1, however, it is possible to vary the size of the meat particles produced between wide limits. The faster the knife speed relative to the speed of the conveying screw 12, the smaller the particles of chopped meat. A further variation of operating conditions possible with the apparatus of FIGS. 5 and 6 is a reversal of the direction of rotation of the knife which, however, requires replacement of the discharge conveyor screw 32 together with the supporting cylinder 34 and flange 31 by an assembly having an oppositely inclined helix of screw flights. Because of the threaded connection between the elements concerned, this change can be made very quickly.

It is a common feature of the afore-described embodiments of this invention, that the meat when under maximum compression between the end of the conveying screw 12 and the cutting plate 4 is not in contact with moving machine elements, and thus not subject to tearing and crushing. Although the soft pieces of meat are unavoidably forced against each other at high pressure, they cannot damage each other to any significant extent. As the meat passes the cutting area, it is comminuted by shearing blades only, and the pressure is simultaneously released.

The temperature rise in meat ground by the apparatus of this invention is smaller by an order of magnitude than that in conventional meat grinders. It has thus become possible to grind frozen meat substantially without thawing it in the grinder. The advantages from the point of view of hygiene and of maintaining the taste of the meat which does not lose its juices will be evident to those familiar with the problem of making ground meat or sausages from frozen meat.

The appearance of meat ground in the apparatus of the invention is much more attractive than that of conventionally ground meat because of the division of the meat into almost uniform, cleanly delineated discrete particles bounded by flat surfaces.

The grinder of the invention requires substantially less power than the usual grinders for an equal throughput of meat. The lower pressures prevailing in the cutting area extend the useful lives of the cutting plates and rotary knife blades between sharpenings. Because of their symmetrical shapes, the rotary knife and cutter plate of the invention may simply be reversed when cutting edges on one side become dull, and both sides are eventually reground at the same time. It is possible that the lower operating temperature of the grinder of the invention may have some bearing on the slower rate of dulling of the shearing tools.

Many modifications of the meat grinder of the invention will readily suggest themselves to those skilled in the art on the basis of the foregoing teachings, and it will be understood that this disclosure relates to preferred embodiments of the invention only, and that numerous modifications or alterations may be made therein without departing from the spirit and scope of the invention as set forth in the appended claims.

What is claimed is:
1. In a grinder for meat and like material, the combination of
   A. a housing formed with an elongated cavity having a longitudinal axis,
   B. conveying means for feeding material to be ground through said cavity in the axial direction toward one end portion of the cavity,
   C. a non-rotatable cutter assembly movable axially in said end portion of the housing and including a pair of rigid cylindrical rings and an axially thin, annular cutter mounted between said rings and having an inner edge portion projecting radially inward beyond said rings, said axially thin cutter having spaced apart recesses in said inner edge portion defining teeth therebetween, and
   D. a rotary knife assembly mounted concentrically within one of said cylindrical rings at the side of said cutter facing in the direction of movement of material to be ground by said conveying means so that the pressure of the material moved by the conveying means urges said cutter against said knife assembly, said knife assembly including a disc-like body extending radially outward beyond the inner ends of said teeth of the cutter and blades extending from the periphery of said body radially outward beyond said recesses of the cutter and into close proximity to said one ring so as to be guided by the latter.
2. In a grinder for meat and like material, the combination as in claim 1;
   wherein each of said blades of the knife assembly is inclined relative to a radial plane by an angle smaller than 90 degrees, and has flat opposite edge surfaces lying in radial planes.
3. In a grinder for meat and like material, the combination as in claim 1;
   wherein said recesses of the cutter are arcuate.
4. In a grinder for meat and like material, the combination as in claim 1;
   wherein the angular spacing between the centers of adjacent recesses of said cutter is substantially greater than the angular spacing between the centers of adjacent blades on said knife assembly.
5. In a grinder for meat and like material, the combination as in claim 1;
   wherein said conveying means includes a conveyor screw member rotatable in said housing about said axis of the latter and having a stub shaft projecting axially from an end of said screw member into said one end portion of the housing; and
   wherein said knife assembly further includes a hub member mounted on said stub shaft and having said body fixed thereto, and a conical guide member fixed on said hub member at the side of said body facing toward said end of the conveyor screw member to rotate with said body and blades and to guide the material to be ground from said conveyor screw member into said recesses of the cutter.
6. In a grinder for meat and like material, the combination as in claim 5;
   further comprising adjustable means acting axially against said hub to urge said guide member against said end of the conveyor screw member.
7. In a grinder for meat and like material, the combination as in claim 5;
   wherein said stub shaft is of non-circular cross-section and said hub member has an axial bore of similar non-circular cross-section receiving said stub shaft so that said knife assembly is rotatable with said conveyor screw member.
8. In a grinder for meat and like material, the combination as in claim 5;
   wherein said stub shaft is cylindrical and said hub member has a cylindrical bore receiving said stub shaft to permit rotation of said knife assembly relative to said conveyor screw member.
9. In a grinder for meat and like material, the combination as in claim 5;
   further comprising helical discharge conveyor means in said end portion of the housing at the side of said body of the knife assembly facing away from said cutter and being rotatable with said knife assembly to carry away material ground by the cooperative action of said cutter assembly and knife assembly.
10. In a grinder for meat and like material, the combination as in claim 5;
    further comprising a cylinder member secured to said hub member for rotation with the latter and extending substantially from said body of the knife assembly in the direction away from said cutter to cooperate with said end portion of the housing in defining an annular passage for receiving the ground material passing between said blades,
    said housing having a discharge orifice opening from said annular passage adjacent the end of said cylinder member remote from said blades,
    at least one helical flight on said cylinder member extending up to said discharge orifice for conveying the ground material from the blades to said orifice, and
    scraper means extending through said orifice into contact with said cylinder member for removing the ground material from the latter.

References Cited in the file of this patent
UNITED STATES PATENTS

| 1,021,000 | Mitchell | Mar. 26, 1912 |
| 2,401,236 | Fielitz | May 28, 1946 |

FOREIGN PATENTS

| 14,514 | Great Britain | 1889 |
| 62,938 | Germany | June 27, 1892 |